United States Patent [19]

Gifford

[11] Patent Number: 4,933,411

[45] Date of Patent: Jun. 12, 1990

[54] PROCESS FOR VACUUM PACKING FOOD PRODUCTS

[76] Inventor: Dennis W. Gifford, 1237 Brickyard Rd., #304, Salt Lake City, Utah 84106

[21] Appl. No.: 308,474

[22] Filed: Feb. 10, 1989

[51] Int. Cl.$^5$ .................... A23L 3/00; A23L 3/015; A23L 3/28

[52] U.S. Cl. .................... 426/399; 426/248; 426/326; 426/392; 426/404; 426/521

[58] Field of Search ............... 426/404, 407, 521, 248, 426/419, 418, 410, 412, 324, 326, 124, 399, 392

[56] References Cited

U.S. PATENT DOCUMENTS

| | | | |
|---|---|---|---|
| 2,482,507 | 9/1949 | Rentschler et al. | 426/248 |
| 2,524,182 | 10/1950 | Teigen | 426/506 |
| 3,396,040 | 8/1968 | Cohen | 426/404 |
| 4,055,672 | 10/1977 | Hirsch et al. | 426/418 |
| 4,055,931 | 11/1977 | Myers | 426/410 |
| 4,241,094 | 12/1980 | O'Neil et al. | 426/404 |
| 4,484,517 | 11/1984 | Amann | 426/418 |
| 4,533,585 | 8/1985 | Holden | 426/124 |
| 4,548,852 | 10/1985 | Mitchell | 426/410 |
| 4,549,478 | 10/1985 | Entes | 426/506 |
| 4,711,789 | 12/1987 | Orr et al. | 426/324 |

FOREIGN PATENT DOCUMENTS

| | | | |
|---|---|---|---|
| 739417 | 7/1966 | Canada | 426/404 |
| 63-059834 | 3/1988 | Japan | 426/324 |
| 986178 | 3/1965 | United Kingdom | 426/404 |

*Primary Examiner*—Donald E. Czaja
*Assistant Examiner*—D. Workman
*Attorney, Agent, or Firm*—K. S. Cornaby

[57] ABSTRACT

A new method of vacuum packaging food products utilizing a vacuum and seal following a blanch and achieving a combination of heat and reduced pressure which causes a critical point or boiling point of water, resulting in microbial kill in excess of that achieved by the blanch alone and significantly enhancing shelf life and safety of the food products.

10 Claims, No Drawings

PROCESS FOR VACUUM PACKING FOOD PRODUCTS

BACKGROUND OF THE INVENTION

The ability to maintain food in a preserved state for varying amounts of time without spoilage has been known for some time, and has comprised many and varied methods. The present method for preserving food by means of special treatment and vacuum processing is a new and more efficient method than those disclosed in the prior art. The present method provides improvements over prior methods because it reduces or eliminates various steps in processing, while still maintaining high levels of sterilization and achieving extended shelf life. The reduction or elimination of processing steps has the advantageous result of lowering production costs.

It is an objective of this invention to provide a means for packaging fresh blanched vegetables which sterilizes and preserves the vegetable product while achieving extended shelf life.

It is a further objective of this invention to provide a means for packaging fresh blanched vegetable products which is less time consuming, more efficient, and less expensive.

SUMMARY OF THE INVENTION

The process disclosed herein comprises a method of preparing the food product including vegetable and meat products for packing, peeling, washing, sterilization, and vacuum packaging. The packaging involves a unique combination of two containers, one comprising an inner porous plastic container which allows water, falling from the vegetable product by force of gravity, to exit the inner bag, and a second or outer air-impermeable container which acts as a reservoir for the water exiting the inner bag. The method of vacuum processing utilizes the existing heat or the heat added, as in the blanch, of the vegetable product, attained as a result of the prior pasturization step, to achieve a point of vaporization when external pressure is reduced. This procedure further reduces any residual bacteria and preserves the vegetable product for an extended shelf life.

In addition to the vacuum process as described herein, experimentation with ozonation, or introduction of $O_3$ into the vegetable product, at a point following the vacuum procedure has proven to be successful in reducing bacteria and extending shelf life. A complete description of the procedure follows.

DESCRIPTION OF THE PREFERRED EMBODIMENT

The process described herein may be used with any kind of food product. In the following descriptions and test results, however, potatoes are used for illustration.

The process begins with washing of the vegetable product to remove dirt and other foreign substances. In this step a mild chlorine spray may be used to disinfect the vegetable product. After washing the vegetable product, or, in this case, the potato, an evenflow system is used to meter entry of potatoes into the plant in a uniform manner.

The potatoes are then skin on or peeled utilizing either a lye bath or steam heat procedure. In the steam procedure, the potatoes are put into a vessel in which steam is injected at 250 psi. Enough pressure is produced thereby to keep water at a liquid state at approximately 400° F. When the heat has penetrated the potato at the desired depth, the pressure is rapidly released, causing an explosion at that depth heated above the point of vaporization. All organisms are thus killed and the exterior of the potato is sterile.

Following the peeling procedure, the potato is scrubbed. This procedure removes the cooked peeling particles and cleans the exterior of the potato. Brushes are used to accomplish this step, and the cooked peel is removed as a slurry. Notably, the use of water for this step causes problems with waste disposal. The potato is then polished by means of a water spray and brushes. The polishing procedure removes any excess peeling particles, and refines and conditions the outer surface of the potato.

The potato is then inspected by hand on a line or grading table, and all defects, bruises, or undesirable portions are removed. The potato may then be returned to the washing and polishing procedure for reprocessing if all of the peeling was not removed in the prior step.

The potato is then processed through a centrifugal food pump containing an impeller for pumping whole potatoes through the pipes of the pump system. High pressure water coursing through the pipes flushes the potatoes through the pipes, and through a grid of knives internally fixed within the pipes. The potatoes are forced through grid blades causing the potato to be cut into any one of a variety of shapes. Alternatively, the potato may be passed through the system whole. The cut potatoes exit the pump and are discharged over a de-watering shaker. The potatoes are carried across a screen to the next procedure in the process, and the water is returned to the pump. As the water is returned to the pump, it passes through a filtering means which selectively removes starch from the water, and the water is then passed through an ultraviolet light source to kill any residual microorganisms.

The potatoes then come off the moisture-removing shaker onto a screen which eliminates off-size pieces by shaking. By this procedure, only properly sized vegetable products pass over the shaker to the next step.

Next, the potatoes are blanched. Blanching raises the temperature of the vegetable product to a level which destroys the ability of naturally occuring enzymes to function. In addition, blanching reduces microorganisms found on the food product. Enzymes act as catalysts in the oxidation and reduction of carbohydrates at relatively rapid rates at low temperatures. Without enzymes, plant tissue cannot change starch to sugar or sugar to starch. There are various blanching procedures available. For example, an auger-type blancher may be used. It pulls the potatoes through a bath of water heated to approximately 160° F. This blanching procedure has the added advantage of not only killing enzymes, but of leaching sugars from the potato. A blancher in a reel-type conformation, which removes water at the discharge and introduces fresh water at the intake, serves to effectuate both the killing and leaching processes.

After blanching, the potatoes are placed in a food pump which transports the potatoes, in water, to the packaging area. The circulating water not only serves as transportation means, but can be used to introduce various conditioners to the potatoes. For example, if sugar content is too low, sugar may be added to the water at this phase of processing. Similarly, ascorbic acid or any other food preservative may be added to enhance color, texture, taste, etc. Further, the transporting water may be used to heat or cool the vegetable product in preparation for vacuum packing. The transporting water is then returned to the pump by recycling means, and starch or other undesired substances are removed. This recycled water also passes through an ultraviolet light to kill any residual bacterial.

The potato is then de-watered in a clean-room in which the air is filtered, recirculated through ultraviolet light, and slightly pressurized. As part of the water removal process, the potatoes are also rinsed with clean water the temperature of which is consistent with the temperature of the vegetable product to maintain the desired heat.

The potatoes are then placed into the first or primary containers. These are porous plastic bags or boxes which allow any moisture still adhering to the potatoes to fall away from the vegetable by means of gravity. The moisture passes out through the porous bag. The primary containers are then placed in a second, air-impermeable plastic container which will fit into a cardboard carton for placement in a vacuum chamber. The impermeable container has a reservoir into which may fall any residual water or condensate, thus keeping it away from the vegetable product in the primary container. The plastic container bags are sealed once the vacuuming process has been completed. This process can also be used without employing Porous plastic bags. The vacuum chamber at the point of vaporization serves to cool the vegetable product, kill any remaining bacteria, dehydrate the product, and seal the outer or second container to prevent recontamination. This step of the process is unique from other processing methods because it neither requires freezing of the vegetable product nor treatment of the product with high and prolonged temperatures to achieve destruction of microorganisms.

The heat removal function of the vacuum processing is important to the packaging process. When water is in the liquid form, it requires pressure and heat to exist in that form. When, at a constant heat, enough pressure is removed, the water changes to a gas or vapor. When, at a constant pressure, sufficient heat is removed, water changes to a solid or ice. Therefore, when the potato product, heated to 160° F., is exposed to a vacuum of sufficiently reduced pressure, the liquid will vaporize. By way of example, fifty-five pounds of potatoes, heated to 160° F. as a result of the blanching process, is approximately 80% (or 44 pounds) of water, and 20% (or 11 pounds) of solids. Forty-four pounds of water in the potato product at 160° F. contain 127.9 BTU of heat per pound as a liquid. (One pound water heated one degree fahrenheit requires one BTU of added heat; 32° F. +127.9 =159.9 or 160° F.)

As the air is pulled from the chamber, the pressure is reduced. When the pressure is reduced to the point of vaporization of 160° F. water, the water boils or turns into a gas state. This point is reached when the pressure is 4.7414 psi. Vacuum pressures are maintained within a range of atmospheric pressure to 29.5" Hg gauge, or from atmospheric pressure to 0.5 psi. As one pound of the 160° F. liquid water changes to a gas, it acquires from its surroundings 1002.2 BTU of added heat. This 1002.2 BTU of additional heat, added to the 127.9 BTU liquid heat total 1130.2 BTU of removed heat. This gas or water vapor is removed from the chamber. Forty-four pounds of water from the potatoes, at 160° F. and 127.9 BTU per pound equals 5630.24 BTU. A net loss of 2260.40 BTU from loss of two pounds of water at the gas phase leaves a remainder of 3369.84 BTU.

The vacuum procedure also serves to kill bacteria. Most bacteria exist on the earth below temperatures of 120° F. Therefore, most common bacteria are killed at 160° F. Additionally, because most bacteria are found at pressures extant on the earth's surface, bacteria cannot survive the sudden change in pressure achieved in the vacuum chamber. Further, because bacteria are comprised of 80% water, that component of the bacteria rises to the temperature of 160° F. The reduction of pressure in the vacuum processing causes the water content of bacteria to vaporize and the cell literally explodes from the internal pressure. Removal of water and air by the process also deprives anerobic bacteria the necessary medium for growth.

The drying function of the vacuum processing also has the added advantage of improving the flavor and texture of potatoes and other vegetables. That is, taking the example above, fifty-five pounds of potatoes containing forty-four pounds of water and eleven pounds of solids when entering the chamber, contain forty-two pounds of water and eleven pounds of solids when removed from the vacuum chamber, two pounds of water having been removed in the process. This change raises the specific gravity, or the ratio of solid to water. That change produces a higher solid content in the vegetable, producing a crispier, mealier, and more flavorful product.

In the vacuum process, when the desired moisture and heat are removed by vaporization at reduced pressure, sterile air or enert compositions of gases are reintroduced to the chamber. When the atmospheric pressure is restored, the heat bars activate to form a seal on the open part of the outer or secondary container. The functions of the vacuum system are then complete.

It should be noted that the pressure in the vacuum chamber may be controlled with a diversity of variables in order to manipulate the vaporization point. The chamber controls pressure and the pressure controls the heat and physical states of the $H_2O$ such as fluid, vapor, or solid state. The following table presents an understanding of some of the possible variables:

| Heat (°F.) | Pressure ABS PSI Inches | Volume Liquid Sq. Ft. | Volume Gas Sq. Ft. | Heat BTU Liquid | Heat BTU Gas |
| --- | --- | --- | --- | --- | --- |
| 90 | .6980 | .016099 | 468.100 | 58.018 | 1100.8 |
| 120 | 1.6927 | .016204 | 203.250 | 87.970 | 1113.6 |
| 160 | 4.7414 | .016395 | 77.270 | 127.960 | 1130.2 |
| 212 | 14.6960 | .016719 | 26.782 | 180.170 | 1150.5 |

By controlling the temperature of the incoming product, the amount of vaporization, or expansion of water to vapor, or of water vapor removed can also be controlled. Also, by controlling the temperature of the product entering, the temperature of the exiting product may also be controlled. To some extent, control can be exercised over which portions of the product are vaporized. For example, if the surface is cooled and the center is hotter, the center must give off heat first. Conversely, if the surface is hotter, the surface will give off heat first.

In experiments performed on potatoes, the results of which follow, some of the packaged potatoes were ozonated following the point of vaporization in the vacuum processing procedure.

TEST RESULTS

Experimental tests, executed in triplicate, using potatoes as the vegetable product were performed. In the first testing, one hundred and fifty grams of potatoes were prepared. (Step 1) One half of the potatoes were then transferred to a flask and heated, in sterile purified water, to 65.5° C. +/−2° C. (150° F.) for ten minutes (Step 2). The potatoes were then transferred to one liter of sterile water heated to 82° C. +/−2° C (180° F.) and held for two minutes (Step 3). The potatoes were then divided between three plastic bag containers and placed in pint jars brought to a temperature of 82° C., and were then placed in a vacuum oven. The oven was then evacuated to the point of vaporization (Step 4).

One group of jars was held at 20°–25° C. for seven days (Step 5). One group of jars was stored at 2°–8° C. for 28 days (Step 6). The third group was ozonated immediately after the point of vaporization, and one was analyzed immediately for bacteria while the other two were analyzed at seven days and twenty-eight days respectively. Table 1 contains the results of the first experiment.

TABLE 1

| STEP | Total Bacteria Result | | | AVERAGE |
|---|---|---|---|---|
| | 1 | 2 | 3 | |
| 1: INITIAL | 252000 | 187000 | 593000 | 344000 |
| 2: 65.5° C. | 733 | 9360 | 8470 | 6188 |
| 3: 82° C. | 300 | 707 | 483 | 497 |
| 4: VACUUM | <10 | <10 | 717 | 239 |
| 5: 7 DAY | <10 | 40 | 167 | 69 |
| 6: 28 DAY | <10 | <10 | 3370 | 1123 |
| 7: OZONE INITIAL | NA | NA | 290 | 290 |
| 8: OZONE 7 DAY | NA | NA | <10 | <10 |
| 9: OZONE 28 DAY | NA | NA | 10 | 10 |

The results indicate that the blanching process kills a significant number of bacteria. Ozonation appears to be helpful in reducing the amount of bacteria present after long storage periods.

TABLE 2

| STEP | (Mold and Yeast) Results | | | AVERAGE |
|---|---|---|---|---|
| | 1 | 2 | 3 | |
| 1: INITIAL | 5267 | 6270 | 8100 | 6546 |
| 2: 65.5° C. | 380 | 403 | 543 | 442 |
| 3: 82° C. (180) | 17 | 10 | 7 | 11 |
| 4: VACUUM | <10 | <10 | <10 | <10 |
| 5: 7 DAY | <10 | <10 | <10 | <10 |
| 6: 28 DAY | <10 | <10 | <10 | <10 |
| 7: OZONE INITIAL | NA | NA | <10 | <10 |
| 8: OZONE 7 DAY | NA | NA | <10 | <10 |
| 9: OZONE 28 DAY | NA | NA | <10 | <10 |

The results indicate that the blanching process kills a significant number of molds and yeast, and the vacuum processing kills significantly more.

A second experiment was conducted using the other portion of the potato samples. The same steps were followed as for the first experiment, except that the potatoes were heated to 93° C. +/− 2° C. (200° F.) in Step 3, and ozonation of the third batch was not performed. The results are shown in Table 3 below.

TABLE 3

| STEP | Total Bacteria Result | | | AVERAGE |
|---|---|---|---|---|
| | 1 | 2 | 3 | |
| 1: INITIAL | 252000 | 187000 | 593000 | 344000 |
| 2: 65.5° C. | 733 | 9360 | 8470 | 6187 |
| 3: 93° C. | 310 | 600 | 1280 | 730 |
| 4: VACUUM | <10 | <10 | 450 | 150 |
| 5: 7 DAY | <10 | 25 | 317 | 114 |
| 6: 28 DAY | <10 | <10 | 417 | 139 |

Again, the results indicate a reduction in bacteria through the blanching and vacuum processing stages.

I claim:

1. A method for vacuum processing food products for increased pasturization and extended shelf-life comprising the steps of:
   preparation of the food product for packaging;
   initial washing of the food product to remove foreign substances;
   polishing of the food product by means of water and brushes;
   inspection of the food product, and trimming or removal of any residual outer covering or undesirable portions of the food;
   cutting of the product into desired sizes or shapes, with a simultaneous second washing of the food product;
   removal of water by means of a shaking procedure;
   removal of undesirable defects;
   blanching of the food product to raise the temperature of the product to a level sufficient to reduce bacteria and to inactive indigenous enzymes;
   de-watering of the food product in a clean-room in which the air is filtered, circulated through ultraviolet light, and slightly pressurized, said de-watering being simultaneously accomplished with a rise of water of a temperature equal to or greater than the temperature of the food product to insure constant elevated temperature;
   placement of the food product in a first container means;
   placement of said first container means containing the food product in a second container means comprising an air-impermeable plastic material;
   placement of the containers of food products in a vacuum apparatus;
   processing the containers of food products at reduced pressures sufficient to effectuate a point of vaporization;
   building the pressure back to atmospheric pressure; and
   sealing of said containers.

2. A method for vacuum processing food products as set forth in claim 1 in which said initial washing procedure for removal of foreign substances is accomplished by use of water impregnated with a disinfectant for disinfection of the food product.

3. A method for vacuum processing food products as set forth in claim 1, in which said loosening of the outer skin or covering is accomplished by use of hot lye at a temperature of 180° F.

4. A method for vacuum processing food products as set forth in claim 3, in which said loosening of the outer skin or covering is accomplished by placement of said food product into a vessel, followed by injection of hot steam into said vessel at 250 psi.

5. A method for vacuum processing food products as set forth in claim 1, in which said water from said secondary washing is recirculated to remove excess sugars, and is circulated past an ultraviolet light source to kill residual bacteria, and in which said water used for transportation of said food products to the packaging stage is also recirculated past an ultraviolet source to kill residual bacteria.

6. A method for vacuum processing food products as set forth in claim 1, in which said blanching process is accomplished with water at a temperature of between 140° and 200° F.

7. A method for vacuum processing food products as set forth in claim 1, in which additives may be introduced into said water used to transport said food products to said packaging stage.

8. A method for vacuum processing food products as set forth in claim 1, in which said vacuum processing occurs at a pressure range between atmospheric and 29.5" Hg gauge, psi range of 0.5 to atmospheric.

9. A method for vacuum processing food products as set forth in claim 1, in which said second container means is comprised of a reservoir internal to the container for collection of water seeping from said inner or primary porous container.

10. A method for vacuum processing food products as set forth in claim 1, which further comprises the step of introducing ozone to said food product immediately following achievement of said point of vaporization in said vacuum processing step, or after desired low pressure is achieved, and to build up pressure or to add pressure with other gases to get back to atmospheric pressure.

* * * * *

UNITED STATES PATENT AND TRADEMARK OFFICE
CERTIFICATE OF CORRECTION

PATENT NO. : 4,933,411
DATED : JUNE 12, 1990
INVENTOR(S) : DENNIS W. GIFFORD

It is certified that error appears in the above-identified patent and that said Letters Patent is hereby corrected as shown below:

Col. 6, line 37, delete "rise", should read --rinse--.

Signed and Sealed this

Eighth Day of October, 1991

Attest:

HARRY F. MANBECK, JR.

Attesting Officer

Commissioner of Patents and Trademarks